US009218638B2

(12) United States Patent
Mehta et al.

(10) Patent No.: US 9,218,638 B2
(45) Date of Patent: Dec. 22, 2015

(54) METHOD, SYSTEM, AND COMPUTER-READABLE MEDIUM FOR EMBEDDING AND EXTRACTING A WATERMARK IN A VIDEO

(75) Inventors: Sachin Mehta, Nagrota Bagwan (IN); Vijayaraghavan Varadharajan, Salem (IN); Rajarathnam Nallusamy, Thuraiyur Taluk (IN)

(73) Assignee: Infosys Limited, Bangalore (IN)

( * ) Notice: Subject to any disclaimer, the term of this patent is extended or adjusted under 35 U.S.C. 154(b) by 291 days.

(21) Appl. No.: 13/532,418

(22) Filed: Jun. 25, 2012

(65) Prior Publication Data
US 2013/0259294 A1 Oct. 3, 2013

(30) Foreign Application Priority Data

Mar. 27, 2012 (IN) .......................... 1140/CHE/2012

(51) Int. Cl.
*G06K 9/00* (2006.01)
*G06T 1/00* (2006.01)

(52) U.S. Cl.
CPC ....... *G06T 1/0028* (2013.01); *G06T 2201/0051* (2013.01); *G06T 2201/0061* (2013.01)

(58) Field of Classification Search
None
See application file for complete search history.

(56) References Cited

U.S. PATENT DOCUMENTS

| 7,035,427 | B2 | 4/2006 | Rhoads | |
|---|---|---|---|---|
| 7,171,018 | B2 | 1/2007 | Rhoads et al. | |
| 7,336,802 | B2* | 2/2008 | Kunisa | G06T 1/005 380/46 |
| 7,386,147 | B2 | 6/2008 | Bodo et al. | |
| 7,391,880 | B2* | 6/2008 | Reed et al. | 382/100 |
| 7,653,210 | B2 | 1/2010 | Rhoads | |
| 7,787,671 | B2* | 8/2010 | De Leon | G06T 7/0012 378/4 |
| 7,983,443 | B2* | 7/2011 | Rhoads | G06Q 20/341 382/100 |
| 8,036,419 | B2 | 10/2011 | Rhoads et al. | |
| 8,055,012 | B2 | 11/2011 | Rhoads | |
| 8,705,737 | B2* | 4/2014 | Suzuki | 380/203 |
| 8,824,859 | B2* | 9/2014 | Geyzel et al. | 386/260 |
| 8,861,781 | B2* | 10/2014 | Kuraki et al. | 382/100 |
| 8,891,934 | B2* | 11/2014 | Messmer | 386/224 |
| 2006/0056653 | A1* | 3/2006 | Kunisa | 382/100 |
| 2006/0072780 | A1* | 4/2006 | Zarrabizadeh | 382/100 |

OTHER PUBLICATIONS

Zou et al., "Compressed Video Stream Watermarking for Peer-to-Peer Based Content Distribution Network," Jun. 2009.

(Continued)

*Primary Examiner* — Nancy Bitar
(74) *Attorney, Agent, or Firm* — LeClairRyan, a Professional Corporation

(57) ABSTRACT

The present invention relates to a computer-implemented method, system and computer readable medium for embedding a watermark into a video and extracting a watermark from the original or copy of the watermarked video. The method comprises converting a video frame from RGB color space to YUV color space. Divide a chrominance component into plurality of blocks. Select plurality of blocks based on size of watermark. Associate a pixel in the watermark with selected plurality of blocks. Embed the watermark corresponding to selected plurality of blocks wherein embedding comprises replacing a first pixel value of the block with maximum value of first column of the block if binary value of the corresponding watermark pixel is one or else replace with minimum value. Combine Y component and chrominance components resulting processed YUV video frame and convert it to RGB video frame. Extract the watermark substantially in a reverse process.

45 Claims, 6 Drawing Sheets

(56) References Cited

OTHER PUBLICATIONS

Gopal et al., "Watermarking of Digital Video Stream for Source Authentication," IJCSI International Journal of Computer Science Issues 7(4)(1):18-25 (2010).

Mitrea et al., "Proving Video Stream Watermarking Viability," Jul. 2008.

TVaura, "TVaura for Live Broadcast Tracking," retrieved at http://www.tvaura.com/assets/pdf/TVaura_WP_VideoBroadcastTracking.pdf on Jul. 6, 2012.

Huss et al., "Digital Watermarking-Based Authentication Techniques for Real-Time Multimedia Communication," Jul. 2008.

* cited by examiner

METHOD, SYSTEM, AND COMPUTER-READABLE MEDIUM FOR EMBEDDING AND EXTRACTING A WATERMARK IN A VIDEO

CROSS-REFERENCE TO RELATED APPLICATIONS

This application claims the benefit of Indian Patent Application Filing No. 1140/CHE/2011, filed Mar. 27, 2012, which is hereby incorporated by reference in its entirety.

FIELD

The present invention relates to the field of Multimedia Security. In particular, the present invention provides a computer-implemented method, system and computer readable medium for embedding a watermark into a video and extracting a watermark from the watermarked video.

BACKGROUND

With the advancement of technology, media content have been migrated from analog to digital format. Although analog to digital transition has offered better user-experience and new means of content production, distribution, and monetization, it has made illegal reproduction and distribution of digital content easier. Piracy of digital media content is increasing day by day and is a major cause of worry for the digital content owners.

Rapid growth of technology has enhanced the usage and distribution of digital media. Although digital media is enriched with several advantages such as easy to store, transmit, etc., it has raised many security concerns such as protection of digital rights. Movie industry is incurring a loss of billions of dollars every year due to piracy and violation of digital rights. In order to prevent piracy and other digital rights violations, digital watermarking has emerged as a potential solution. Secret information is embedded inside the digital media which is later extracted to prove the ownership of the media element.

The protection of a digital content is a major concern nowadays. Earlier cryptography based methods are used for the protection of digital rights. But these traditional cryptography based methods fail to protect the digital content from copyright infringement. Digital watermarking has emerged as a solution to protect the digital content. Digital watermarking is a fundamental step towards Copyright Protection, Authenticity and Digital Rights Protection.

The ongoing distribution of digital media is managed by Digital Rights Management (DRM) based systems. DRM based systems ignore the Traditional Rights and Usages (TRU) of digital media users and hence, suffer from interoperability and mobility issues. To preserve the TRU of digital media users and combat piracy, digital watermarking based systems are proposed.

Video watermarking is an active area of research for last decade. A number of video watermarking algorithms are proposed by the researchers. These algorithms can be classified into two domains:

Pixel domain video watermarking—The watermark is embedded in the video frames by simple addition or bit replacement of selected pixels. These methods are computationally fast but less robust.

Transform domain video watermarking—The video frame is transformed and watermark is embedded in the transform coefficients. These methods are robust to common signal processing attacks like compression, etc. but require high computational time.

The video watermarking techniques should satisfy various characteristics such as Imperceptibility, Robustness, Real-time embedding, Security, Blind detection and Capacity. All of these characteristics are hard to attain in a single watermarking algorithm and hence, a trade-off is required between the characteristics. For example, transform based methods are robust to signal processing attacks but they require high computational time which makes them applicable only to stored videos and not for real-time applications.

The existing algorithms have limitations as most of the algorithms are based on transform domain due to their robustness against signal processing attacks. These algorithms are applicable only to the stored videos. The algorithms (robust) embed watermark either using the frequency domain transforms or variable length code words (VLC). These algorithms require high computational time.

Further, the existing algorithms are applicable to stored videos (compressed or uncompressed domain) and these algorithms are not capable of processing the video in real-time because of high computational time.

Thus, there is a need to overcome the problems of the existing technologies. Therefore, the present inventors have developed a computer-implemented method, system and computer readable medium for embedding a watermark into a video in real-time while capturing it or while delivering or streaming it i.e. on-the-fly and extracting the watermark from the watermarked video which would protect the videos from copyright infringement and authenticity.

SUMMARY

According to one aspect of the invention there is provided a computer implemented method executed by one or more computing devices for embedding a watermark into a video. The method comprises the steps of converting at least one predetermined size of a video frame from RGB color space to YUV color space. Divide a chrominance component one of the video frame into a plurality of blocks of a predetermined size wherein each of the block comprises a plurality of pixels, wherein each of the pixel being associated with a value. Select plurality of blocks based on a predetermined size of the watermark. Associate at least one pixel in the watermark with at least one in the selected plurality of blocks. Embed the watermark corresponding to the selected plurality of blocks wherein embedding comprises determining a maximum value of a first column of the block and replacing a first pixel value of the block with the maximum value of the first column of the block if the binary value of the corresponding watermark pixel is one; or determining a minimum value of a first column of the block and replacing a first pixel value of the block with the minimum value of the first column of the block if the binary value of the corresponding watermark pixel is zero, whereby obtaining a processed chrominance component one of the video frame. Combine a Y component and a chrominance component two of the video frame to the processed chrominance component one of the video frame resulting in a processed YUV video frame and convert the processed YUV video frame to a RGB video frame.

According to another aspect of the invention there is provided a computer implemented method executed by one or more computing devices for extracting a watermark from the watermarked video. The method comprises converting at least one predetermined size of a video frame from a RGB color space to a YUV color space. Divide a chrominance component one of the video frame in which watermark is embedded into a plurality of blocks of a predetermined size wherein each block comprises a plurality of pixels, wherein each pixel being associated with a value. Extract the watermark from the corresponding known plurality of blocks wherein the extraction comprises determining the watermark binary value is one if a first pixel value of the block is greater than or equal to an average value of the first column of the block; or determining the watermark binary value is zero if a first pixel value of the block is less than the average value of the first column of the block. Obtain a final watermark from the plurality of watermarks extracted from the each video frame based on a maximum occurrence of the watermark binary value corresponding to the pixel in the plurality of extracted watermarks.

According to another aspect of the invention there is provided a system for embedding a watermark into a video. The system comprises a memory and a processor operatively coupled to the memory. The processor configured to perform the steps of converts at least one predetermined size of a video frame from RGB color space to YUV color space. Divide a chrominance component one of the video frame into a plurality of blocks of a predetermined size wherein each of the block comprises a plurality of pixels, wherein each of the pixel being associated with a value. Select plurality of blocks based on a predetermined size of the watermark. Associate at least one pixel in the watermark with at least one in the selected plurality of blocks. Embed the watermark corresponding to the selected plurality of blocks wherein embedding comprises determining a maximum value of a first column of the block and replacing a first pixel value of the block with the maximum value of the first column of the block if the binary value of the corresponding watermark pixel is one; or determining a minimum value of a first column of the block and replacing a first pixel value of the block with the minimum value of the first column of the block if the binary value of the corresponding watermark pixel is zero, whereby obtaining a processed chrominance component one of the video frame. Combine a Y component and a chrominance component two of the video frame to the processed chrominance component one of the video frame resulting in a processed YUV video frame and convert the processed YUV video frame to a RGB video frame.

According to another aspect of the invention there is provided a system for extracting a watermark from the watermarked video. The system comprises a memory and a processor operatively coupled to the memory. The processor configured to perform the steps of converting at least one predetermined size of a video frame from a RGB color space to a YUV color space. Divide a chrominance component one of the video frame into a plurality of blocks of a predetermined size wherein each block comprises a plurality of pixels, wherein each pixel being associated with a value. Extract the watermark from the corresponding known plurality of blocks wherein the extraction comprises determining the watermark binary value is one if a first pixel value of the block is greater than or equal to an average value of the first column of the block; or determining the watermark binary value is zero if a first pixel value of the block is less than the average value of the first column of the block. Obtain a final watermark from the plurality of watermarks extracted from the each video frame based on a maximum occurrence of the watermark binary value corresponding to the pixel in the plurality of extracted watermarks.

According to another aspect of the invention there is provided a computer-readable code stored on a non-transitory computer-readable medium that, when executed by a computing device, performs a method for embedding a watermark into a video. The method comprises the steps of convert at least one predetermined size of a video frame from RGB color space to YUV color space. Divide a chrominance component one of the video frame into a plurality of blocks of a predetermined size wherein each of the block comprises a plurality of pixels, wherein each of the pixel being associated with a value. Select plurality of blocks based on a predetermined size of the watermark. Associate at least one pixel in the watermark with at least one in the selected plurality of blocks. Embed the watermark corresponding to the selected plurality of blocks wherein embedding comprises determining a maximum value of a first column of the block and replacing a first pixel value of the block with the maximum value of the first column of the block if the binary value of the corresponding watermark pixel is one; or determining a minimum value of a first column of the block and replacing a first pixel value of the block with the minimum value of the first column of the block if the binary value of the corresponding watermark pixel is zero, whereby obtaining a processed chrominance component one of the video frame. Combine a Y component and a chrominance component two of the video frame to the processed chrominance component one of the video frame result a processed YUV video frame and convert the processed YUV video frame to a RGB video frame.

According to another aspect of the invention there is provided a computer-readable code stored on a non-transitory computer-readable medium that, when executed by a computing device, performs a method for extracting a watermark from the watermarked video. The method comprises converting at least one predetermined size of a video frame from a RGB color space to a YUV color space. Divide a chrominance component one of the video frame into a plurality of blocks of a predetermined size wherein each block comprises a plurality of pixels, wherein each pixel being associated with a value. Extract the watermark from the corresponding known plurality of blocks wherein the extraction comprises determining the watermark binary value is one if a first pixel value of the block is greater than or equal to an average value of the first column of the block; or determining the watermark binary value is zero if a first pixel value of the block is less than the average value of the first column of the block. Obtain a final watermark from the plurality of watermarks extracted from the each video frame based on a maximum occurrence of the watermark binary value corresponding to the pixel in the plurality of extracted watermarks.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein.

DETAILED DESCRIPTION

While system and method are described herein by way of example and embodiments, those skilled in the art recognize that system and method for embedding a watermark into a video and extracting a watermark from the watermarked video are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

Disclosed embodiments provide a computer-implemented method, system and computer readable medium for embedding a watermark into a video and extracting a watermark from a video.

Figure 1:
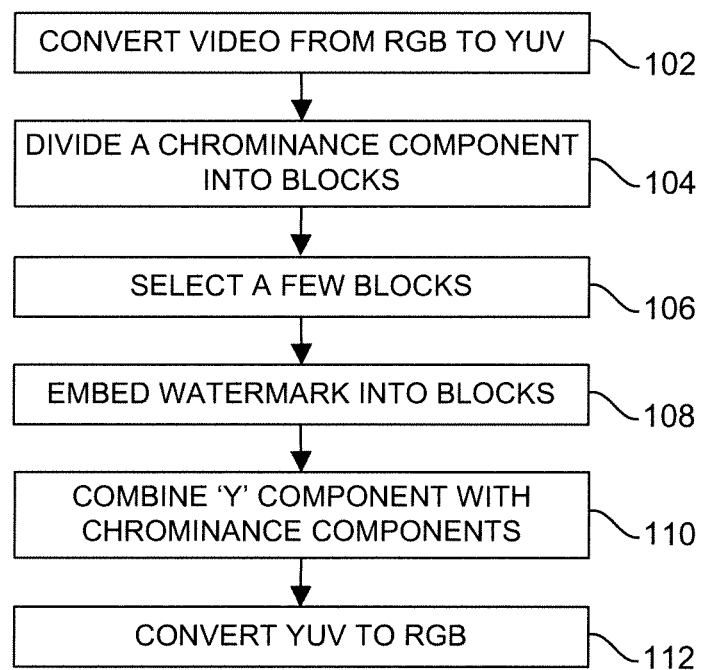
FIG. 1 shows a flowchart depicting a method for embedding a watermark into a video, in accordance with an embodiment of the present invention.

FIG. 1 shows a flowchart depicting a method for embedding a watermark into a video, in accordance with an embodiment of the present invention. A video frame having dimension N×M is captured and is converted from RGB to YUV color space (102). Watermark is embedded in the chrominance component (either U or V). Divide a chrominance component one of the video frame into a plurality of blocks of a predetermined size (104) wherein each the block comprises a plurality of pixels, wherein each the pixel being associated with a value. Each pixel is identified by its coordinates in the block. Once blocks are obtained, randomly select a plurality of the blocks (106) based on a predetermined size of the watermark. Each block is identified by its position in a reference grid. Associate at least one pixel in the watermark with at least one in the selected plurality of blocks. Embed the watermark corresponding to the selected plurality of blocks (108) wherein embedding comprises determining a maximum value of a first column of the block and replacing a first pixel value of the block with the maximum value of the first column of the block if the binary value of the corresponding watermark pixel is one; or determining a minimum value of a first column of the block and replacing a first pixel value of the block with the minimum value of the first column of the block if the binary value of the corresponding watermark pixel is zero, whereby obtaining a processed chrominance component one of the video frame. After that, combine a Y component and a chrominance component two of the video frame to the processed chrominance component one of the video frame (110) resulting a processed YUV video frame and again convert the processed YUV video frame to a RGB video frame (112).

The present invention optionally comprises a pre-processed watermark, which may be a spread-out watermark or a scrambled watermark. The watermark preprocessing is done to prevent unauthorized access to the watermark. To achieve this security requirement of watermarking scheme, watermark is spread out before embedding it into the video. Watermark can be spread out/scrambled either using spread spectrum based techniques such as a pseudo-noise sequence (PN Sequence) or using transforms such as Torus Automorphism. In the present invention, watermark W is scrambled evenly using a scrambling function like Arnold Transform (Torus Automorphism).

Let us represent watermark (W) as $$W(i,j) \in \{0,1\} \text{ and } 1 \leq i,j \leq n \tag{1}$$

Arnold transform is applied $A_t$ times on watermark (W) to obtain scrambled watermark ($W_S$) as $$W_S(i, j) = W\left(\begin{bmatrix} 2 & 1 \\ 1 & 1 \end{bmatrix} \begin{bmatrix} i \\ j \end{bmatrix} \mod n\right) \tag{2}$$

$W_S$ is converted into a linear array $W_{is}$ as $$W_{is}(k) = W_S(i,j) \quad 1 \leq k \leq n^2 \tag{3}$$

$W_{is}$ is the preprocessed watermark which is embedded inside the video.

A video frame (F) is captured and converted from RGB to YUV color space. Watermark is embedded in the chrominance component (either U or V). In the present method, watermark is embedded in the V component. V component is then divided into blocks of dimension 8×8. Let us represent these blocks as $$\left. \begin{array}{l} \text{Total number of } 8 \times 8 \text{ blocks in frame } F \text{ having} \\ \text{dimension } (N \times M) : T = (N/8) * (M/8) \\ \text{Blocks: } B = \{B_1, B_2, \ldots \ldots, B_T\} \end{array} \right\} \tag{4}$$

Since the number of watermark bits ($n^2$) is very less than total number of blocks (T), therefore $n^2$ blocks need to be selected from B to embed the watermark. Once blocks are selected, watermark has to be embedded in these blocks. A random matrix (R) having dimension 1×n² is generated. The values (v) of random matrix (R) lie in between 1 and T in ascending order.

$$R=\{v_1, v_2, \ldots, v_n^2\}, v \in \{1, T\} \quad (5)$$

The blocks whose block number matches with the value (v) of random matrix (R) are separated from B and are represented as $$A=\{B_q\}, q \in R \quad (6)$$

Each pixel in an image is highly correlated with their neighboring pixels. Hence, changing the value of one pixel per block will not degrade the quality of image. The watermark bit is embedded in first pixel of every block A using Eq. (7).

$$A = \begin{cases} \max(A(l, 0)), & \text{if } W_{ls} = 1 \\ \alpha X \min(A(l, 0)), & \text{if } W_{ls} = 0 \end{cases} \quad (7)$$

where 0≤l≤7

It is very difficult to decode the watermark bit when maximum and minimum values of the block are substantially same. Hence, minimum value is scaled down with the parameter αα. The value of αα should lie between 0 and 1. After that, watermarked V component is combined with the Y and U components to obtain YUV watermarked frame. YUV frame is then converted to RGB frame.

Figure 2:
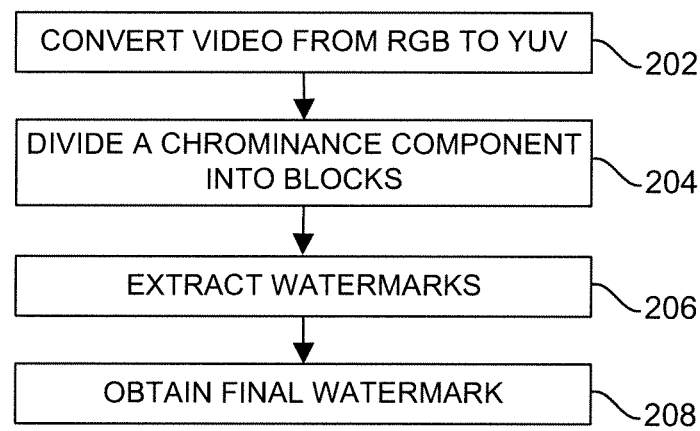
FIG. 2 shows a flowchart depicting a method for extracting a watermark from a video, in accordance with an embodiment of the present invention.

FIG. 2 shows a flowchart depicting a method for extracting the watermark from the original or a copy of the watermarked video, in accordance with an embodiment of the present invention. The present method is for extracting the watermark without the knowledge of original multimedia content. A video frame (F') of the captured video is converted from RGB color space to YUV color space (202). The V-component of the frame (F') is divided into 8×8 blocks (204). The V component of the frame may be divided into 16×16 blocks or any other suitable size. The location of random blocks (R) chosen for embedding the watermark is known at the extraction phase. These random blocks (R) are chosen and watermark is extracted from these blocks (206). If the first pixel value (corresponding to index (0, 0)) is greater than or equal to the average of the first column of that particular block, then watermark bit is decoded as one. Otherwise, watermark bit is decoded as zero. Watermark is embedded in each frame during the embedding process. Therefore, at the extraction phase, total number of watermarks extracted is equal to number of frames. A final watermark is constructed (208) from all the watermarks extracted from the frames using some decision. In the present method, decision is made using maximum occurrence of bit value (either 0 or 1) corresponding to same pixel location in all extracted watermarks.

Representation of the blocks as

Total number of 8×8 blocks in frame F' having dimension (N'×M');

$$T' = \left(\frac{N'}{8}\right) * \left(\frac{M'}{8}\right)$$

Blocks: $B'=\{B'_1, B'_2, \ldots, B'_T\}$ \quad (8)

At the embedding stage, watermark bit is embedded in few random blocks R. The values v of R shall be known at the receiver side. The blocks whose block number matches with v are separated from B' and are represented as $$A'=\{B'_q\}, q \in R \quad (9)$$

The watermark bit is embedded in (0, 0) pixel location of every block A. In order to extract the watermark bit, firstly, statistical average of first column of every block A' is computed and stored in a linear array Avg as $$Avg(p)=\text{average}(A'_p(l,0)), 0 \le l \le 7, 1 \le p \le n^2 \quad (10)$$

Average value Avg of first column of every block A' is then compared with the first pixel value, (0, 0) pixel location, of respective blocks in A' and linear watermark array $W'_{is}$ is constructed using Eq. 11.

$$W'_{ls}(p) = \begin{cases} 1, & Avg(p) \ge A'_p(0, 0) \\ 0, & \text{otherwise} \end{cases} \quad (11)$$

Two dimensional watermark $W'_S$ is formed from $W'_{is}$ as $$W'_S(i,j)=W'_{is}(k), 1 \le k \le n^2, 1 \le i, j \le n \quad (12)$$

Arnold transform is applied $A_t$ times to $W_S'$ to get watermark W' as $$W'(i, j) = W'_S\left(\begin{bmatrix} 2 & 1 \\ 1 & 1 \end{bmatrix} \begin{bmatrix} i \\ j \end{bmatrix} \bmod n\right) \quad (13)$$

Watermark is extracted from all the frames. Suppose, there are $F_N$ frames, watermarks extracted at the receiver side will also be $F_N$. A final watermark needs to be constructed from these $F_N$ watermarks based on some decision. In the present invention, decision is made using maximum occurrence of bit value (either 0 or 1) corresponding to same pixel location in all extracted watermarks. This decision can be represented mathematically using Eq. 14.

$$W_F(i,j)=\text{maximumOccurence}(W'_r(i,j)), 1 \le i, j \le n, \\ 1 \le r \le \text{total number of Frames} \quad (14)$$

Figure 3:
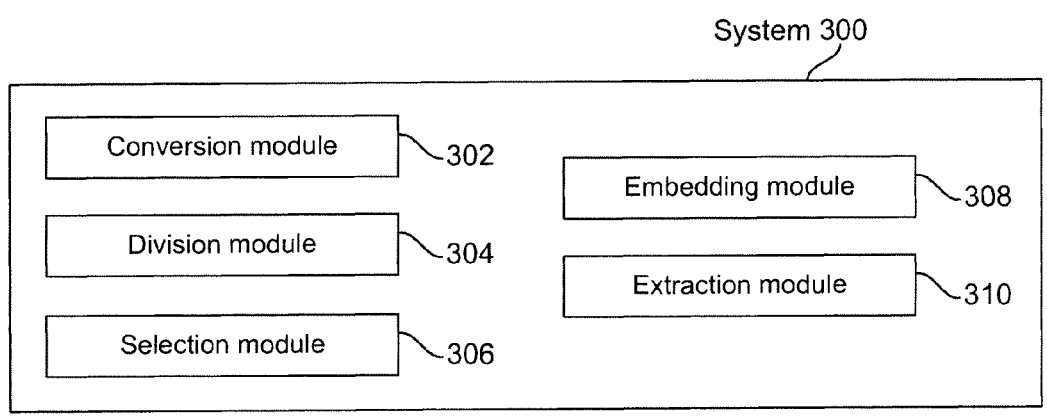
FIG. 3 shows a system for embedding a watermark into a video and extracting a watermark from a video.

FIG. 3 shows a system for embedding a watermark into a video and extracting a watermark from a video. The system comprises a conversion module (302), a division module (304), a selection module (306), an embedding module (308) and an extraction module (310). The conversion module (302) is configured to convert a video frame from RGB color space to a YUV color space. It also converts a video frame from YUV color space to a RGB color space. The division module (304) is configured to divide the chrominance component (U or V) of a video frame into a number of blocks. The selection module (306) selects a few blocks based on the size of the watermark. The embedding module (308) is configured to embed the watermark into the corresponding blocks. The extraction module (310) is configured to extract the watermark from the video.

Exemplary Computing Environment

Figure 4:
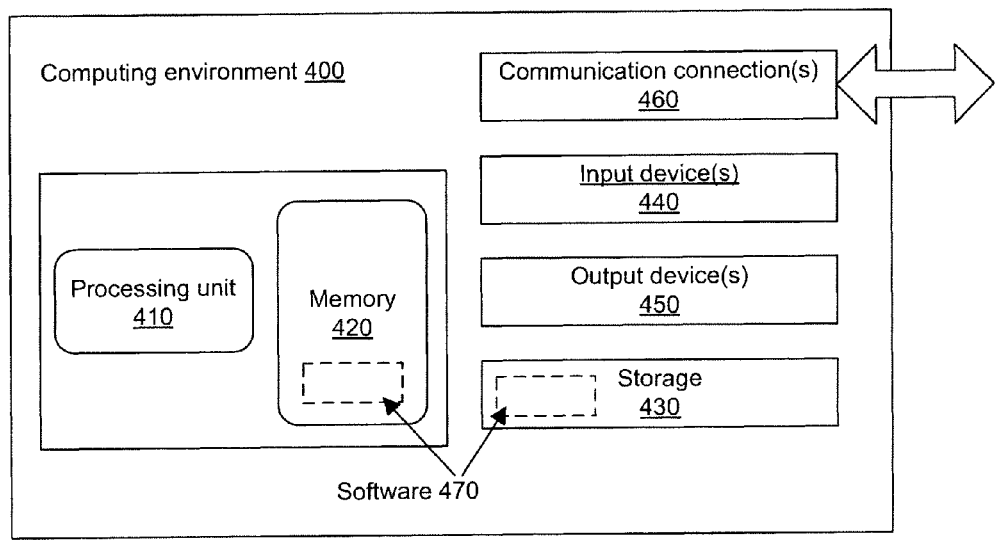
FIG. 4 shows a generalized computer network arrangement, in one embodiment of the present technique.

One or more of the above-described techniques may be implemented in or involve one or more computer systems. FIG. 4 shows a generalized example of a computing environment 400. The computing environment 400 is not intended to suggest any limitation as to scope of use or functionality of described embodiments.

With reference to FIG. 4, the computing environment 400 includes at least one processing unit 410 and memory 420. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 470 implementing described techniques.

A computing environment may have additional features. For example, the computing environment 400 includes storage 430, one or more input devices 440, one or more output devices 450, and one or more communication connections 460. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 430 may be removable or non-removable, and includes magnetic disks, magnetic tapes or cassettes, CD-ROMs, CD-RWs, DVDs, or any other medium which may be used to store information and which may be accessed within the computing environment 400. In some embodiments, the storage 430 stores instructions for the software 470.

The input device(s) 440 may be a touch input device such as a keyboard, mouse, pen, trackball, touch screen, or game controller, a voice input device, a scanning device, a digital camera, or another device that provides input to the computing environment 400. The output device(s) 450 may be a display, printer, speaker, or another device that provides output from the computing environment 400.

The communication connection(s) 460 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 420, storage 430, communication media, and combinations of any of the above.

Figure 5:
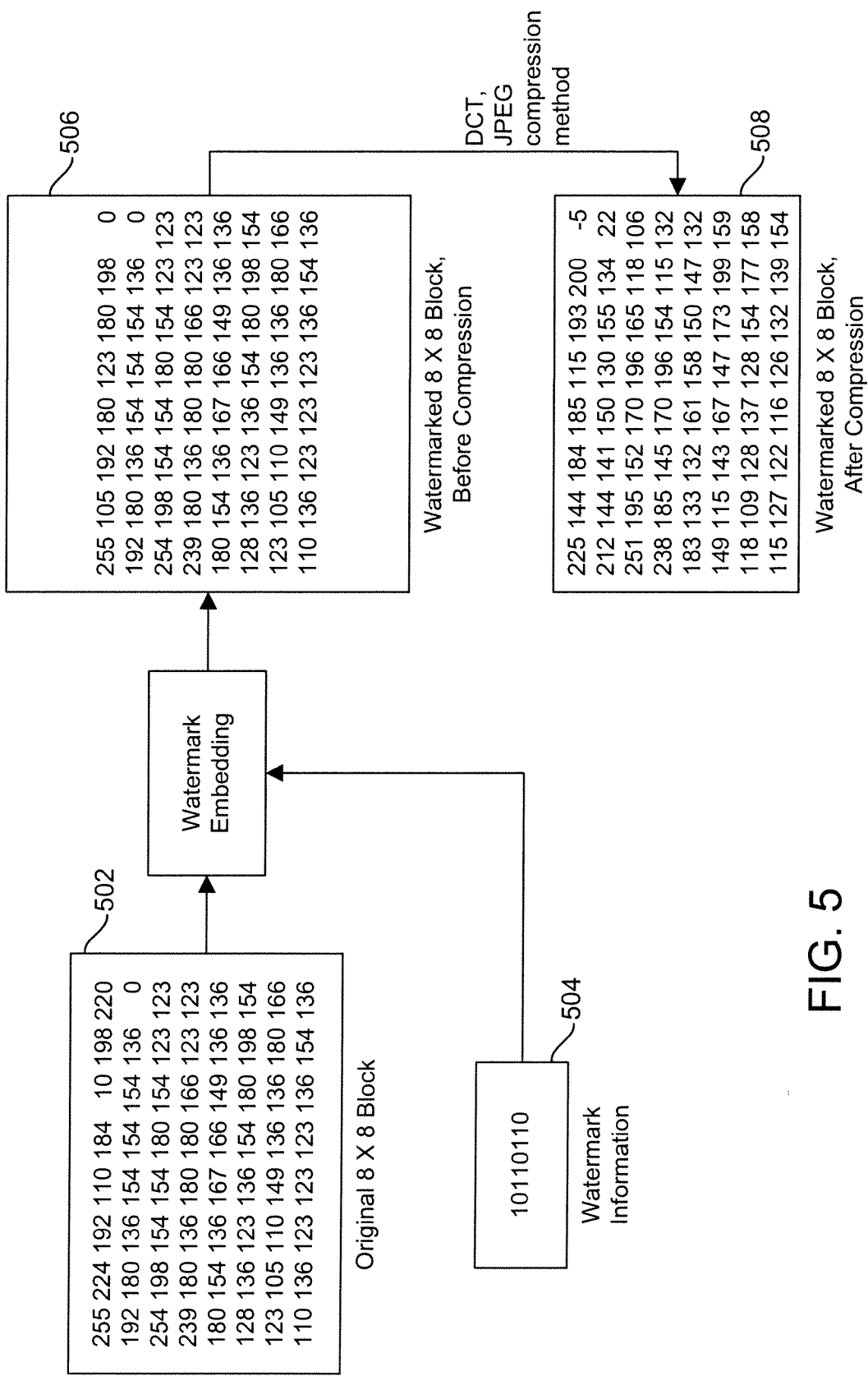
FIG. 5 shows the method for embedding a watermark for the chosen sample data, in accordance with an embodiment of the present invention.

FIG. 5 shows the method for embedding a watermark for the chosen sample data, in accordance with an embodiment of the present invention. As shown in the figure, an original block having sample data has been taken (502). The block has a size of 8×8. A watermark (504) having information (10110110) is embedded within the block. As watermark is embedded with the block resulting a watermarked block (506) of size 8×8, which is in a pre-compressed form. This watermarked block (506) is to be compressed by DCT, JPEG compression method or any conventional compression method thereby a compressed watermark block (508) of size 8×8 is obtained.

Figure 6:
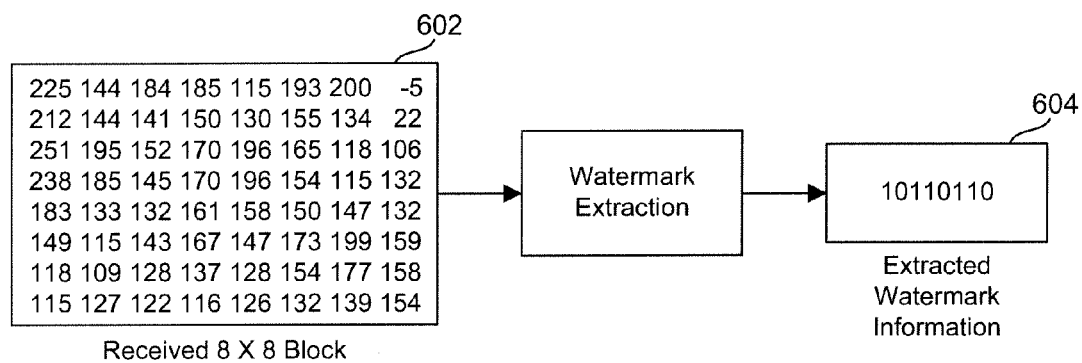
FIG. 6 shows the method for extracting a watermark from the received sample data, in accordance with an embodiment of the present invention.

FIG. 6 shows the method for extracting a watermark from the received sample data, in accordance with an embodiment of the present invention. In this method, the received block (602) of size 8×8 has been taken, which contains a watermark. The watermark (604) is extracted from that block having information (10110110).

It is observed from FIG. 5 and FIG. 6 that the watermark (10110110) which is embedded during the embedding process is identical with the watermark (10110110) which is extracted from the received sample data.

The present invention is applicable to both stored and on-the-fly video watermarking for the copyright protection of digital videos. The present method utilizes statistical functions to reduce watermark embedding time. Inventors have conducted experiments using different videos to measure the watermark embedding time and also conducted various experiments on watermarked videos to test the robustness of the present invention against attacks, such as frame dropping, noising, cropping, sampling, etc. The experimental results show that the present method takes around 30 milliseconds/frame to embed the watermark inside the video in real-time and is robust against attacks on the video.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for embedding a watermark into a video, the method comprising:
    converting, by an image management computing device, at least one predetermined size of a video frame, of the video, from a Red Green Blue (RGB) color space to a YUV color space;
    dividing, by the image management computing device, a first chrominance component of the video frame into a plurality of blocks of a predetermined size wherein each of the plurality of blocks comprises a plurality of pixels, wherein each of the plurality of pixels is associated with a pixel value;
    selecting, by the image management computing device, the plurality of blocks based on a predetermined size of the watermark;
    associating, by the image management computing device, at least one pixel in the watermark with at least one pixel in the selected plurality of blocks;
    embedding, by the image management computing device, the watermark corresponding to the selected plurality of blocks to obtain a processed first chrominance component, wherein the embedding comprises:
    determining, by the image management computing device, a minimum pixel value of a column of a block in the plurality of blocks and replacing a pixel value of the block with the minimum pixel value of the column of the block when a binary value of a corresponding watermark pixel is zero;
    creating, by the image management computing device, a processed YUV video frame by combining a Y component and a second chrominance component of the video frame with the processed first chrominance component of the video frame; and
    converting, by the image management computing device, the processed YUV video frame to a RGB video frame.

2. The method of claim 1 further comprising:
    generating, by the image management computing device, a scrambled watermark by applying a scrambling function to a pre-processed watermark a predetermined number of times.

3. The method of claim 1 further comprising:
    generating, by the image management computing device, a spread-out watermark by applying a spread-out function to a pre-processed watermark.

4. The method of claim 1, wherein the embedding further comprises:
    determining, by the image management computing device, the maximum pixel value of a column of the block in the plurality of blocks and replacing a pixel value of the block with the maximum pixel value of the column of the block when the binary value of the corresponding watermark pixel is one.

5. The method of claim 2, wherein the scrambling function or the descrambling function is an Arnold transform.

6. The method of claim 1, wherein each block is identified by a position of each block in a reference grid and the dimension of each block is 8×8.

7. The method of claim 3, wherein the spread-out function is a pseudo-noise sequence.

8. The method of claim 1, wherein each pixel is identified by coordinates of each pixel in the block.

9. A method for extracting a watermark from a watermarked video, the method comprising:
    converting, by an image management computing device, at least one predetermined size of a video frame, of a watermarked video, from a Red Green Blue (RGB) color space to a YUV color space;
    dividing, by the image management computing device, a first chrominance component of the video frame into a plurality of blocks of a predetermined size wherein each block in the plurality of blocks comprises a plurality of pixels, wherein each pixel in the plurality of pixels is associated with a pixel value;
    extracting, by the image management computing device, a watermark corresponding to the plurality of blocks, wherein the extracting comprises:
    comparing, by the image management computing device, for each block in the plurality of blocks, a pixel value of a first pixel in the block in the plurality of blocks to an average pixel value of the plurality of pixels in a first column in the block;
    determining, by the image management computing device, for each block in the plurality of blocks, a watermark binary value is zero when the pixel value of the first pixel in the block in the plurality of blocks is less than the average pixel value of the plurality of pixels in the first column in the block in the plurality of blocks; and
    obtaining, by the image management computing device, a final watermark from the plurality of watermarks extracted from each video frame based on a maximum occurrence of the watermark binary value corresponding to the pixel value in the plurality of extracted watermarks.

10. The method of claim 9, further comprising:
    extracting, by the image management computing device, a watermark from a scrambled watermark by applying a descrambling function to the scrambled watermark a predetermined number of times, when the watermark is the scrambled watermark.

11. The method of claim 9, further comprising extracting a watermark from a spread-out watermark wherein the spread-out watermark being processed by applying a spread-out function on the spread-out watermark, when the watermark is the spread-out watermark.

12. The method of claim 10, wherein the scrambling function or the descrambling function is an Arnold transform.

13. The method of claim 11, wherein the spread-out function is a pseudo-noise sequence.

14. The method of claim 9, further comprising:
    determining, by the image management computing device, that the watermark binary value is one when the pixel value of the block is greater than the average pixel value of the column of the block or determining the watermark binary value is zero when the pixel value of the block is less than or equal to the average pixel value of the column of the block.

15. A watermark embedding computing device a comprising:
    at least one processor;
    a memory coupled to the processor which is configured to be capable of executing programmed instructions comprising and stored in the memory to:
    convert at least one predetermined size of a video frame, of the video, from a Red Green Blue (RGB) color space to a YUV color space;
    divide a first chrominance component of the video frame into a plurality of blocks of a predetermined size wherein each of the plurality of blocks comprises a plurality of pixels, wherein each the plurality of pixels is associated with a pixel value;

select the plurality of the blocks based on a predetermined size of a watermark;
associate at least one pixel in the watermark with at least one pixel in the selected plurality of blocks;
embed the watermark corresponding to the selected plurality of blocks to obtain a processed first chrominance component, wherein the embedding comprises:
determining a minimum pixel value of a column of a block in the plurality of blocks and replacing a pixel value of the block with the minimum pixel value of the column of the block when a binary value of a corresponding watermark pixel is zero;
create a processed YUV video frame by combining a Y component and a second chrominance component of the video frame to the processed first chrominance component of the video frame; and
convert the processed YUV video frame to a RGB video frame.

16. The device of claim 15 wherein the processor is further configured to be capable of executing programmed instructions comprising and stored in the memory to:
further comprising a pre-processed watermark wherein the pre-processed watermark being processed by applying a scrambling function on the pre-processed watermark in a predetermined number of times so as to obtain a scrambled water mark.

17. The device of claim 15 further comprising a pre-processed watermark wherein the pre-processed watermark being processed by applying a spread-out function on the pre-processed watermark so as to obtain a spread-out watermark.

18. The device of claim 15, wherein the embedding further comprises:
determining a maximum pixel value of a column of a block in the plurality of blocks and replacing a pixel value of the block with the maximum pixel value of the column of the block when the binary value of the corresponding watermark pixel is one.

19. The device of claim 16, wherein the scrambling function or the descrambling function is an Arnold transform.

20. The device of claim 15, wherein each block is identified by a position of each block in a reference grid and the dimension of each block is 8×8.

21. The device of claim 17, wherein the spread-out function is a pseudo-noise sequence.

22. The device of claim 15, wherein each pixel is identified by coordinates of each pixel in the block.

23. A watermark extraction device comprising:
at least one processor;
a memory coupled to the processor and configured be capable of executing programmed instructions comprising and stored in the memory to:
convert at least one predetermined size of a video frame, of a watermarked video, from a Red Green Blue (RGB) color space to a YUV color space;
divide a first chrominance component of the video frame into a plurality of blocks of a predetermined size wherein each block in the plurality of blocks comprises a plurality of pixels, wherein each pixel in the plurality of pixels is associated with a pixel value;
extract a watermark corresponding to the plurality of blocks, wherein the extracting comprises:
comparing, for each block in the plurality of blocks, a pixel value of a first pixel in the block in the plurality of blocks to an average pixel value of the plurality of pixels in a first column in the block;
determining, for each block in the plurality of blocks, a watermark binary value is zero when the pixel value of the first pixel in the block in the plurality of blocks is less than the average pixel value of the plurality of pixels in the first column in the block; and
obtain a final watermark from the plurality of watermarks extracted from the each video frame based on a maximum occurrence of the watermark binary value corresponding to the pixel value in the plurality of extracted watermarks.

24. The device of claim 23, further comprising extracting a watermark from a scrambled watermark wherein the scrambled watermark being processed by applying a descrambling function on the scrambled watermark in a predetermined number of times, when the watermark is the scrambled watermark.

25. The device of claim 23, further comprising extracting a watermark from a spread-out watermark wherein the spread-out watermark being processed by applying a spread-out function on the spread-out watermark, when the watermark is the spread-out watermark.

26. The device of claim 24, wherein the scrambling function or the descrambling function is an Arnold transform.

27. The device of claim 25, wherein the spread-out function is a pseudo-noise sequence.

28. The device of claim 23, further comprising determining the watermark binary value is one when the pixel value of the block is greater than the average pixel value of the column of the block; or determining the watermark binary value is zero when the pixel value of the block is less than or equal to the average pixel value of the column of the block.

29. A non-transitory computer readable medium having stored thereon instructions for embedding a watermark into a video comprising machine executable code which when executed by at least one processor, causes the processor to perform steps comprising:
converting at least one predetermined size of a video frame, of the video, from a Red Green Blue (RGB) color space to a YUV color space;
dividing a first chrominance component of the video frame into a plurality of blocks of a predetermined size wherein each block of the plurality of blocks comprises a plurality of pixels, wherein each pixel is associated with a pixel value;
selecting the plurality of blocks based on a predetermined size of the watermark;
associating at least one pixel in the watermark with at least one pixel in the selected plurality of blocks;
embedding the watermark corresponding to the selected plurality of blocks to obtain a processed first chrominance component, wherein the embedding comprises:
determining a minimum pixel value of a column of a block in the plurality of blocks and replacing a pixel value of the block with the minimum pixel value of the column of the block when a binary value of a corresponding watermark pixel is;
creating a processed YUV video frame by combining a Y component and a second chrominance component of the video frame with the processed first chrominance component of the video frame; and
converting the processed YUV video frame to a RGB video frame.

30. The medium of claim 29 further comprising a pre-processed watermark wherein the pre-processed watermark being processed by applying a scrambling function on the pre-processed watermark in a predetermined number of times so as to obtain a scrambled water mark.

31. The medium of claim 29 further comprising a pre-processed watermark wherein the pre-processed watermark being processed by applying a spread-out function on the pre-processed watermark so as to obtain a spread-out watermark.

32. The medium of claim 29, wherein the embedding further comprises:
determining a maximum pixel value of a column of a block in the plurality of blocks and replacing a pixel value of the block with the maximum pixel value of the column of the block when the binary value of the corresponding watermark pixel is one.

33. The medium of claim 30, wherein the scrambling function or the descrambling function is an Arnold transform.

34. The medium of claim 29, wherein each block is identified by a position of each block in a reference grid and has a dimension of each block is 8×8.

35. The medium of claim 31, wherein the spread-out function is a pseudo-noise sequence.

36. The medium of claim 29, wherein each pixel is identified by coordinates of each pixel in the block.

37. A non-transitory computer readable medium having stored thereon instructions for extracting a watermark from a watermarked video comprising machine executable code which when executed by a processor, causes the processor to perform steps comprising:
converting at least one predetermined size of a video frame, of a watermarked video, from a Red Green Blue (RGB) color space to a YUV color space;
dividing a first chrominance component of the video frame into a plurality of blocks of a predetermined size wherein each block in the plurality of blocks comprises a plurality of pixels, wherein each pixel in the plurality of pixels is associated with a pixel value;
extracting a watermark corresponding to the plurality of blocks, wherein the extracting comprises:
comparing, for each block in the plurality of blocks, a pixel value of a first pixel in the block in the plurality of blocks to an average pixel value of the plurality of pixels in a first column in the block;
determining, for each block in the plurality of blocks, the watermark binary value is zero when the pixel value of the first pixel in the block in the plurality of blocks is less than the average pixel value of the plurality of pixels in the first column in the block; and
obtaining a final watermark from the plurality of watermarks extracted from each video frame based on a maximum occurrence of the watermark binary value corresponding to the pixel value in the plurality of extracted watermarks.

38. The medium of claim 37, further comprising extracting a watermark from a scrambled watermark wherein the scrambled watermark being processed by applying a descrambling function on the scrambled watermark in a predetermined number of times, when the watermark is the scrambled watermark.

39. The medium of claim 37, further comprising extracting a watermark from a spread-out watermark wherein the spread-out watermark being processed by applying a spread-out function on the spread-out watermark, when the watermark is the spread-out watermark.

40. The medium of claim 38, wherein the scrambling function or the descrambling function is an Arnold transform.

41. The medium of claim 39, wherein the spread-out function is a pseudo-noise sequence.

42. The medium of claim 37, further comprising determining the watermark binary value is one when the pixel value of the block is greater than the average pixel value of the column of the block; or determining the watermark binary value is zero when the pixel value of the block is less than or equal to the average pixel value of the column of the block.

43. The method of claim 9, wherein the extracting further comprises:
determining, by the image management computing device, the watermark binary value is one when the pixel value of the first pixel in the block in the plurality of blocks is greater than or equal to the average pixel value of the plurality of pixels in the first column in the block.

44. The device of claim 23, wherein the extracting further comprises:
determining the watermark binary value is one when the pixel value of the first pixel in the block in the plurality of blocks is greater than or equal to the average pixel value of the plurality of pixels in the first column in the block.

45. The medium of claim 37, wherein the extracting further comprises:
determining the watermark binary value is one when the pixel value of the first pixel in the block in the plurality of blocks is greater than or equal to the average pixel value of the plurality of pixels in the first column in the block.

* * * * *